(12) United States Patent
Blanc et al.

(10) Patent No.: US 8,723,383 B2
(45) Date of Patent: May 13, 2014

(54) INTERIOR ROTOR FOR A ROTARY ELECTRICAL MACHINE AND METHOD OF ASSEMBLING IT

(75) Inventors: Maeick Blanc, Chatonnaye (CH); Frederic Progin, Arconciel (CH)

(73) Assignees: Michelin Recherche et Technique S.A., Granges-Paccot (CH); Compagnie Generale des Establissments Michelin, Clermont-Ferrand (FR)

( * ) Notice: Subject to any disclaimer, the term of this patent is extended or adjusted under 35 U.S.C. 154(b) by 0 days.

(21) Appl. No.: 13/059,605

(22) PCT Filed: Jul. 28, 2009

(86) PCT No.: PCT/EP2009/005455
§ 371 (c)(1),
(2), (4) Date: Jun. 9, 2011

(87) PCT Pub. No.: WO2010/020334
PCT Pub. Date: Feb. 25, 2010

(65) Prior Publication Data
US 2011/0254399 A1     Oct. 20, 2011

(30) Foreign Application Priority Data

Aug. 20, 2008  (FR) .................................. 08 55633

(51) Int. Cl.
*H02K 21/12*     (2006.01)
(52) U.S. Cl.
USPC .................................. 310/156.22; 310/156.59
(58) Field of Classification Search
USPC ............ 310/156.08, 156.09, 156.22, 156.48, 310/156.49, 156.51, 156.52, 156.54, 310/156.59, 156.611
See application file for complete search history.

(56) References Cited

U.S. PATENT DOCUMENTS 2,255,477 A * 9/1941 Tullio Tognola ........ 310/156.51
4,631,807 A * 12/1986 Kawada et al. ................. 29/598
(Continued)

FOREIGN PATENT DOCUMENTS

DE     28 10 353     8/1979
DE     197 37 391    3/1999
(Continued)

OTHER PUBLICATIONS

Office Action dated Sep. 9, 2013 issued in the related U.S. Appl. No. 13/059,735.

(Continued)

*Primary Examiner* — Dang Le
(74) *Attorney, Agent, or Firm* — Cozen O'Connor

(57) ABSTRACT

A buried-magnet internal rotor (1) for an electric rotating machine, the rotor including a shaft (2), a plurality of polar parts (30) made of a magnetic material surrounding the shaft, the polar parts delimiting housings (40) between them, a first lateral shroud (5) and a second lateral shroud (5') axially on each side of the polar parts along the shaft (2), the shaft passing through each lateral shroud through a central opening in each lateral shroud, at least one tie-rod (6) per polar part, the tie-rod clamping each polar part between the lateral shrouds, permanent magnets (4) placed in the housings (40), wherein the shaft includes, for the first lateral flange (5), an internal shoulder (22) designed to form an axial abutment against which the first flange is held axially by an external ring (26) secured to the shaft.

12 Claims, 4 Drawing Sheets

(56) References Cited

U.S. PATENT DOCUMENTS

| | | | |
|---|---|---|---|
| 4,700,096 A * | 10/1987 | Epars | 310/153 |
| 5,091,668 A | 2/1992 | Cuenot et al. | |
| 5,121,605 A | 6/1992 | Oda et al. | |
| 5,157,297 A * | 10/1992 | Uchida | 310/156.61 |
| 6,384,504 B1 | 5/2002 | Ehrhart et al. | |
| 6,396,182 B1 * | 5/2002 | Pop, Sr. | 310/156.22 |
| 6,426,576 B1 * | 7/2002 | Varenne | 310/156.09 |
| 6,967,420 B2 | 11/2005 | Laurent et al. | |
| 7,250,702 B2 | 7/2007 | Abou Akar et al. | |
| 2002/0105243 A1 | 8/2002 | Pfetzer | |
| 2004/0004407 A1 | 1/2004 | Laurent et al. | |
| 2007/0169334 A1 | 7/2007 | Matsuyama et al. | |
| 2008/0093945 A1 | 4/2008 | Gruenhagen | |

FOREIGN PATENT DOCUMENTS

| | | |
|---|---|---|
| EP | 0 327 470 | 8/1989 |
| EP | 0 431 514 | 6/1991 |
| EP | 0 866 540 | 3/1998 |
| EP | 1 359 657 | 4/2003 |
| EP | 1 359 657 | 11/2003 |
| FR | 1 317 744 | 5/1963 |
| FR | 2 264 418 | 2/1975 |
| GB | 2 075 274 | 11/1981 |
| JP | 59 178 955 | 10/1984 |

OTHER PUBLICATIONS

Office Action dated Sep. 9, 2013 issued in the related U.S. Appl. No. 13/059,591.

\* cited by examiner

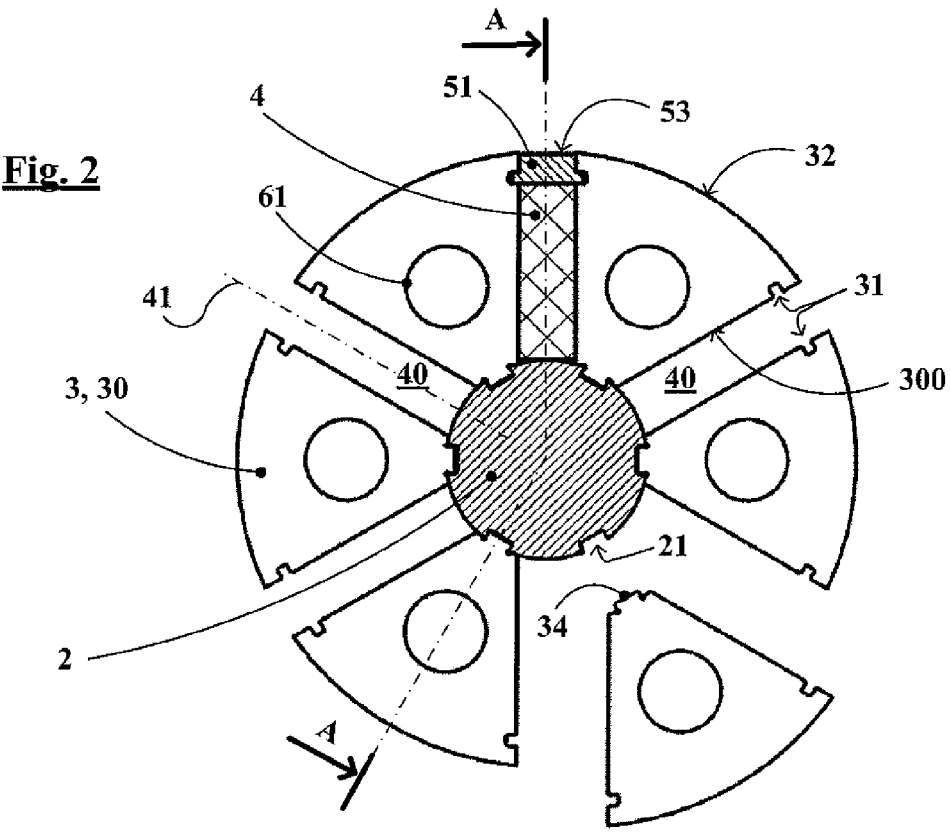
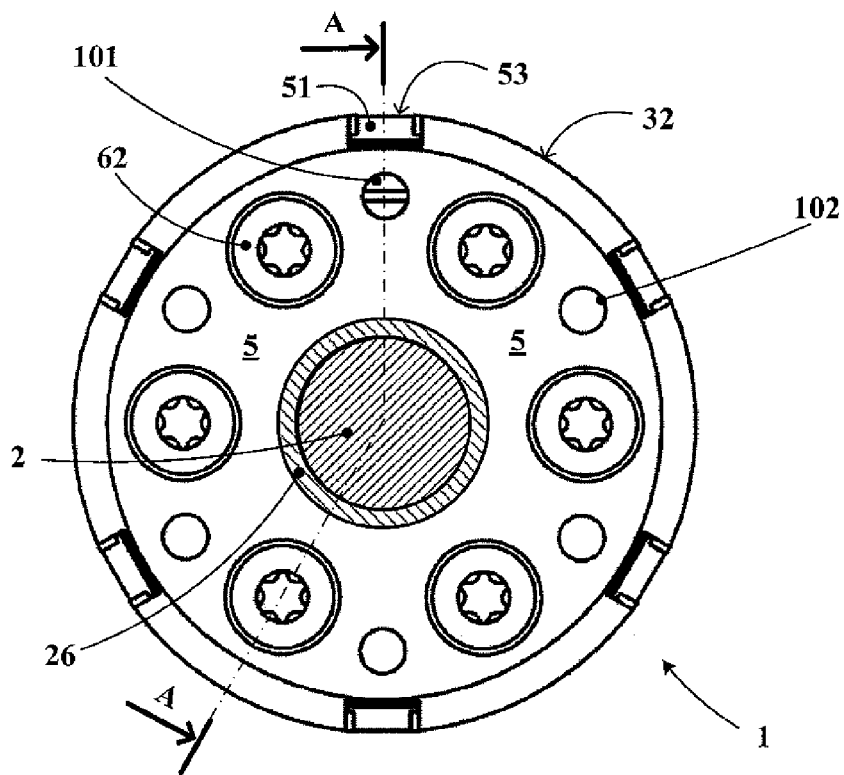
Fig. 2
Fig. 3

INTERIOR ROTOR FOR A ROTARY ELECTRICAL MACHINE AND METHOD OF ASSEMBLING IT

RELATED APPLICATION

This is a U.S. National Phase Application under 35 USC 371 of International Application PCT/EP2009/005455, filed on Jul. 28, 2009.

This application claims the priority of French patent application Ser. No. 08/55633 filed Aug. 20, 2008, the entire content of which is hereby incorporated by reference.

FIELD OF THE INVENTION

The invention relates to electric rotating machines in which the rotor comprises permanent magnets. More precisely, the invention relates to machines in which the magnets are placed in recesses of the rotor. The electric machines in question are commonly designated by the expression "buried-magnet". This arrangement principle of the rotor is widely applied to self-controlled flux density synchronous machines.

BACKGROUND OF THE INVENTION

The size of an electric rotating machine depends on its nominal torque. The higher the torque that a motor is capable of delivering, the bigger the electric motor, all other things being equal. There are however applications for which it is desirable to achieve at the same time considerable powers and a large degree of compactness of the motor. Simply to give a practical example, when it is desired to implant electric traction motors in the wheels of motor vehicles, it is desirable to be able to develop powers of at least 10 kW per motor, and even most of the time at least 25 or 30 kW per motor, for the lowest possible weight in order to limit as much as possible the unsuspended weights. It is also desirable that the space requirement is extremely small, exceeding by as little as possible the internal volume of the wheel so as not to interfere with the elements of the vehicle during travels of suspension and during other types of movement of the wheel relative to the body shell of the vehicle.

These two imperatives (high power, low space requirement and weight) make it very problematical to install electric traction motors in the wheels of passenger vehicles without radically improving the weight/power ratio of the electric machines currently available on the market.

Choosing a high speed for an electric motor when the motor is designed is a solution making it possible, for a given power, to reduce the torque and hence the space requirement. In other words, for a given nominal power of the motor, the higher its nominal rotation speed, the smaller its space requirement will be.

Raising the rotation speed of an electric rotating machine on the other hand poses many problems, notably with respect to the centrifugal forces sustained by the elements of the rotor, in particular the magnets.

The (mechanical and acoustic) vibrations are also a difficulty that increases as the rotation speed increases.

A specific design for achieving high rotation speeds has already been proposed in patent application EP 1001507. The speeds proposed in this patent application are of the order of 12 000 rpm, by proposing for this a particular arrangement of the assembly consisting of a polygonal one-piece shaft and polar parts judiciously placed around this shaft.

An enhancement making it possible to aim at speeds of the order of 20 000 rpm has been proposed in patent application EP 1359657 by proposing for this an arrangement using wedges to radially lock the magnets in their housings.

SUMMARY OF THE INVENTION

One object of the invention is to provide an enhanced rotor, notably with respect to its dimensional stability.

One aspect of the invention relates to a buried-magnet internal rotor for an electric rotating machine, the rotor comprising:

a shaft, a plurality of polar parts made of a magnetic material surrounding the shaft, the polar parts delimiting housings between them, a first lateral shroud and a second lateral shroud axially on each side of the polar parts along the shaft, the shaft passing through each lateral shroud through a central opening in each lateral shroud, at least one tie-rod per polar part, the tie-rod clamping each polar part between the later shrouds, permanent magnets installed in the said housings, wherein the shaft comprises, for the first lateral shroud, an internal shoulder designed to form an axial abutment against which the first flange is held axially by an external ring secured to the shaft.

Preferably, the external ring is shrink-fitted radially onto the shaft.

Again preferably, the second flange can slide along the shaft.

Again preferably, the central opening of the second shroud is such that it can pass over the internal shoulder of the shaft.

Again preferably, the shoulder of the shaft interacts with a facing made in the thickness of the first shroud.

Again preferably, the polar parts consist of a stack of magnetic metal sheets.

Again preferably, the shaft comprises a splined central portion, the internal shoulder being defined by one of the ends of the splined central portion.

The invention also relates to an electric rotating machine comprising such a rotor.

The invention also relates to a method for manufacturing such a rotor, in which a subassembly comprising at least the polar parts is initially assembled, the lateral shrouds and the tie-rods independently of the shaft before, secondly, the said subassembly is placed on the shaft.

Preferably, the method also comprises a step consisting in axially attaching the said subassembly to the shaft by immobilizing the first lateral shroud between the internal shoulder of the shaft and the external ring secured to the shaft.

Again preferably, the external ring is secured to the shaft by radial shrink-fitting.

BRIEF DESCRIPTION OF THE DRAWINGS

FIG. 2 is a partial view in section perpendicular to the axis of the rotor of FIG. 1 following a line B-B that can be seen in FIG. 1.

FIG. 3 is a view in section perpendicular to the axis of the rotor of FIG. 1 following a line C-C that can be seen in FIG. 1.

DETAILED DESCRIPTION OF THE DRAWINGS

Figure 1:
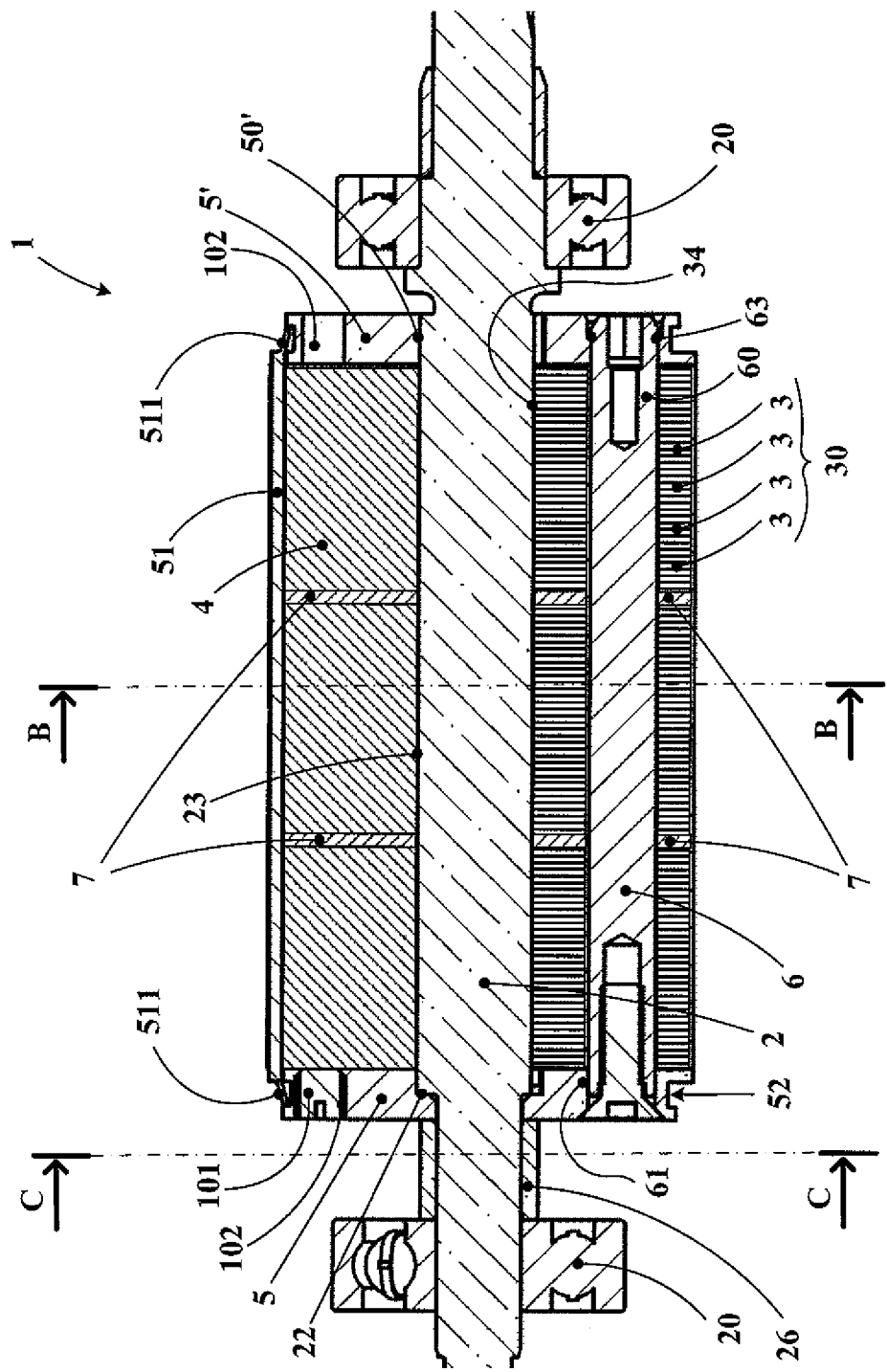
FIG. 1 is a view in section along the axis of a rotor according to an embodiment of the invention following a dashed line A-A that can be seen in FIGS. 2 and 3.

The appended figures show a rotor 1 for a hexapolar machine also comprising a stator that is not shown. The rotor 1 comprises a one-piece shaft 2 resting on bearings 20. Six polar parts 30 can be seen, formed by a stack of ferromagnetic metal sheets 3. Each metal sheet 3 is substantially perpendicular to the axis of the shaft. The metal sheets may be extremely thin, for example of the order of a few tenths of a millimeter, for example 0.2 mm.

Axially on either side of the shaft 2, a lateral shroud 5, 5' (preferably made of a non-magnetic material) can be seen situated on each side of the polar parts 30. FIG. 1 also shows two optional intermediate shrouds 7 (preferably also made of a non-magnetic material). Each lateral shroud and as appropriate each intermediate shroud 7 comprises a central opening. In the non-limiting example described in FIG. 1, the shape of the central opening of the lateral shrouds is circular while that of the central opening of the intermediate shrouds is adjusted to that of the shaft 2, that is to say in this instance splined.

For each of the polar parts 30, a tie-rod 6 passes through the stack of metal sheets 3, as appropriate the intermediate shroud (s), and makes it possible to clamp the assembly between the lateral shrouds 5 and 5'. The centrifugal forces sustained by the polar parts are therefore absorbed by the lateral shrouds and, as appropriate, by the intermediate shrouds to the exclusion of any other means.

According to the invention, the shaft 2 also comprises an internal shoulder 22 designed to interact with a first lateral shroud 5 in order to determine its axial position and therefore the axial position of the polar parts 3 on the shaft 2 (see in particular FIGS. 1, 4, 5 and 6). The shoulder 22 of the shaft 2 preferably rests at the bottom of a facing 50 of the first lateral shroud 5. An external ring 26 secured to the shaft 2 for example by shrink-fitting immobilizes the first lateral shroud 5 by pressing it axially against the shoulder 22 of the shaft 2. The second shroud 5', which can be qualified as "floating", does not therefore rest on a shoulder of the shaft 2, but remains free to move axially as dictated by the thermal expansions of the stack of metal sheets 3. This floating shroud 5' may comprise a facing substantially identical to the facing 50 of the immobilized shroud 5 or, on the contrary, be bored throughout its thickness as shown here (see bore 50' of the second shroud 5').

The shoulder or shoulders 22 preferably correspond to the ends of the splined central portion 23 of the shaft. Because of the presence of the facing 50 and of the bore 50', these ends are then set back in the shrouds 5 and 5'. In this manner, the end metal sheets of the stacks cannot escape from the splined central portion 23 of the shaft. This is particularly advantageous during the assembly of the rotor.

Assuming that the second shroud is identical or similar to the first, that is to say with a facing and not a bore, an axial clearance must remain between this second shroud and the corresponding shoulder on the shaft in order to allow the thermal expansions mentioned above.

Parallelepipedal permanent magnets 4 are shown placed in the housings 40 between the polar parts 30. The housings are interrupted by the intermediate shroud(s) 7. In the example of FIG. 1, there are therefore 3 magnets per pole whereas in the example of FIG. 6, there are only 2 magnets per pole. Each of the housings of the magnets is closed by a magnet wedge 51.

Moreover, as can be seen in FIG. 2, the longitudinal faces 300 of the polar parts 30 each comprise a spline 31 parallel to the axis of the rotor, hollowed out to a radial level close to the external edge 32 of each polar part 30 (and therefore of each metal sheet 3), the said polar parts moreover having a height (or more exactly a radial dimension) slightly greater than the height of the magnets 4. Each wedge 51 therefore rests on two splines 31 placed on each of the adjacent polar parts. The magnets 4 are therefore mechanically secured to the polar parts 30. The essential function of each spline 31 is to form a shoulder in order to oppose the centrifugation of the wedges and of the magnets. The polar parts are themselves secured together by virtue of the tie-rods and the lateral shrouds and if necessary the intermediate shroud(s).

The wedges 51 are T-shaped. The "T" is upside down when looking at a wedge placed at the top of the rotor (FIG. 2). The flanges of the "T" and the splines 31 have flat radial bearing surfaces, that is to say surfaces that are perpendicular to the central radius 41 of the housing 40. This profile of the wedges 51 and of the splines 31 on the one hand allows the rotor to withstand the centrifugation without, on this occasion, generating any force tending to widen the housings 40.

The radial portion (the foot) of the "T" on the other hand fills the space between the polar parts which gives the rotor a practically smooth external surface (even in the absence of grinding) because the radially external surface 53 of the wedge is flush with the external surface 32 of the polar parts.

The top of the wedge 53 may even be slightly domed (preferably adopting the same radius as the outside of the rotor) in order to exactly extend the curvature of the external edge 32 of the metal sheets. In this manner, the high-speed rotation again causes fewer acoustic vibrations (noise).

The T-shaped profiles shown here are preferred profiles but other profiles known per se, such as simple flat (rectangular) profiles, can be used in the context of the present invention.

Figure 5:
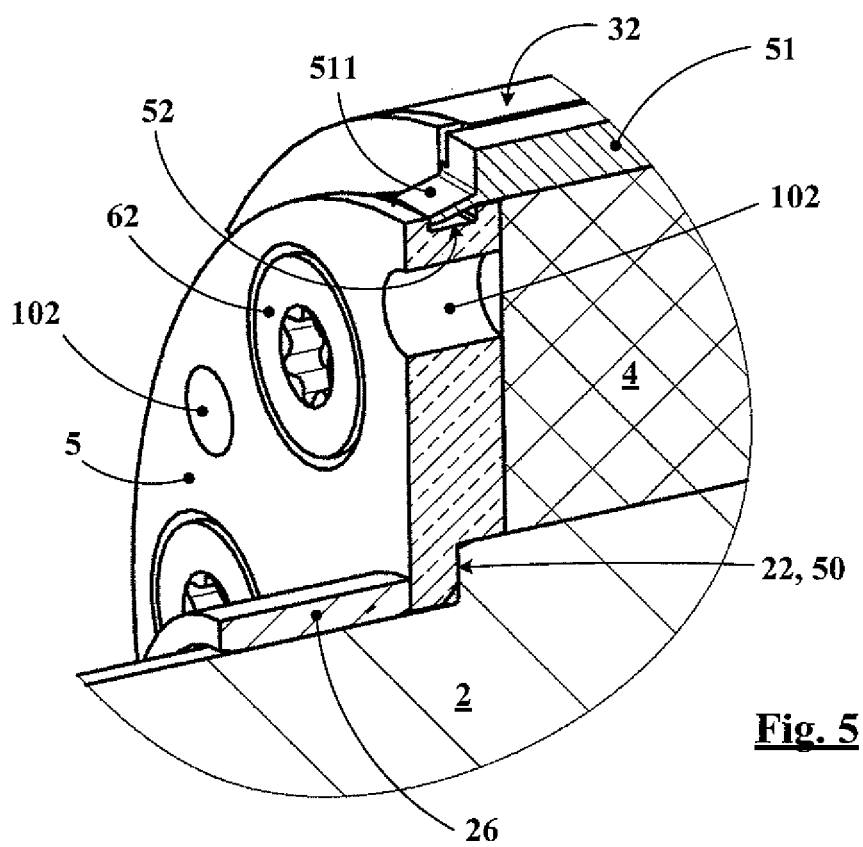
FIG. 5 is a view in perspective of a section along the axis of the rotor of the detailed embodiment of the shrouds and of the magnet wedges.

As detailed in FIG. 5, the ends 511 of the wedges extend axially on either side beyond the polar parts in recesses of the lateral shrouds. Preferably, the ends 511 are made thinner so as to be able to be bent over in a peripheral groove 52 of the lateral shrouds in order to be axially immobilized therein. This arrangement has also been found to be advantageous in the matter of acoustic vibrations (noise) when the motor is rotating at high speed. To allow them to be folded over into the peripheral groove 52, the ends 511 of the wedges are preferably made thinner while not including the radial portion of the T-shaped profile. The ends 511 are then in the form of tongues. Again preferably, the external wall of the peripheral grooves 52 is inclined relative to the axial direction at an angle substantially less than 90°, for example of the order of 70°, in order to create an axial clamping of the wedges when they are bent over.

Preferably, the polar parts 30 comprise a tenon designed to interact with a spline 21 of the shaft 2. It is this connection that directly transmits the torque from the polar parts to the shaft. The splines 21 preferably have parallel walls and interact with tenons with bearing faces that are also parallel. Since the polar parts are, in this instance, formed of a stack of ferromagnetic metal sheets 3, each metal sheet comprises a substantially rectangular radial projection 34 which forms a portion of the tenon. Naturally, if only one portion of the metal sheets of a polar part comprises this projection, the stresses will be concentrated on those metal sheets.

Figure 4:
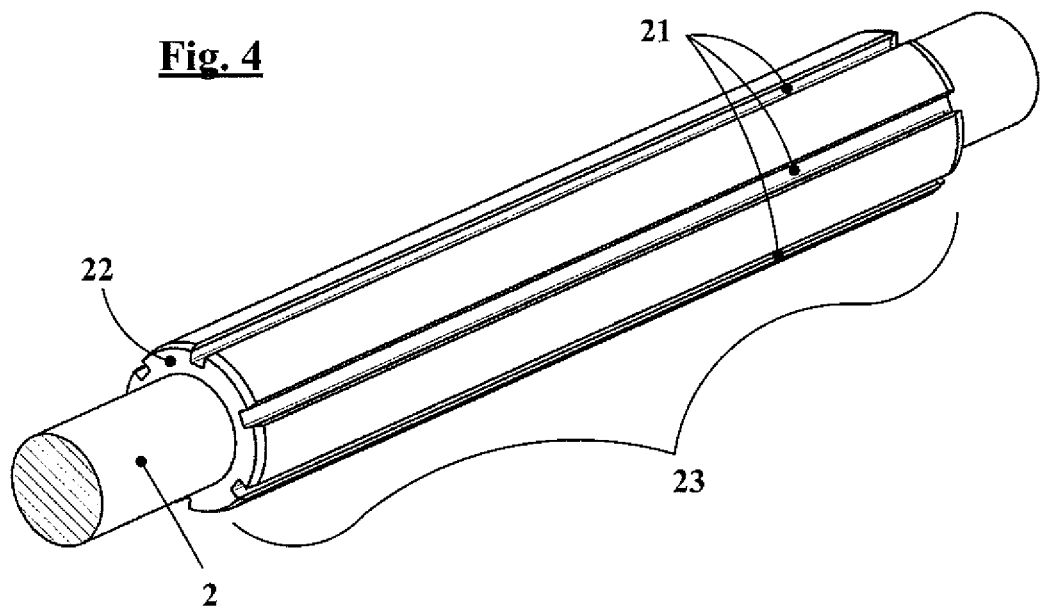
FIG. 4 is a view in perspective of the shaft 2.

FIGS. 2 and 4 show that the shaft preferably comprises as many splines as poles (in this instance six in number) but it can be understood that, depending on the forces involved, it would be possible to restrict oneself to only 4, 3 or even 2 splines.

Weights can also be attached to the shrouds in order to perfect the static and dynamic balance of the rotor.

Figure 6:
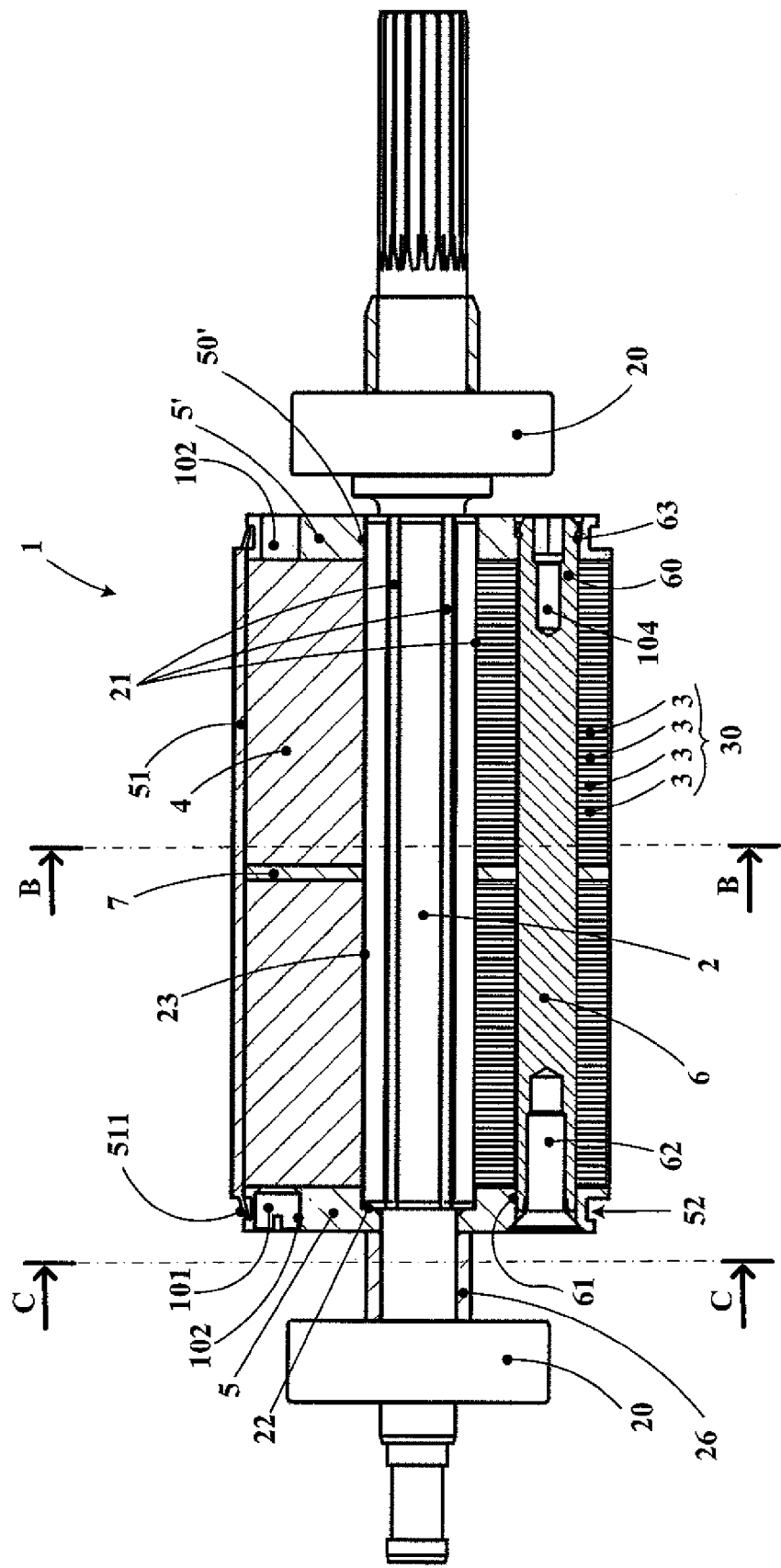
FIG. 6 is a view similar to FIG. 1 of a second embodiment of the rotor according to the invention.

According to the embodiment of FIGS. 1, 3 and 6, the balance weights have the shape of a headless screw 101 which is positioned in threaded drill holes 102 in the shrouds. Preferably, the drill holes are situated as here facing the magnets 4 so that the balance screws can axially clamp the magnets. Each shroud therefore comprises six threaded drill holes 102 in addition to the six passageways 61 for the six tie-rods 6.

According to a second embodiment, the balance weights may also be positioned in indentations 104 in the ends 60 of the tie-rods. The weights may, for example, take the form of headless screws to match the threads made in the indentations of the tie-rods or even in the heads of the tie-rod screws 62.

It can be understood that by varying the position, the length and/or the material chosen for each balance weight, it is possible to adjust the balance of the rotor. Since the number of threads is limited, it is often necessary to combine the effect of two weights, each positioned in a specific drill hole in order to obtain a sufficiently fine balance. To obtain a satisfactory dynamic balance, it is often useful to place weights on each of the two lateral shrouds.

Preferably, the weights are also immobilized by bonding in their threads in order to ensure that they are held in their axial position.

Alternatively, instead of attaching weights to the shrouds, it is possible to make one or more localized machinings of the shrouds by removal of material.

The figures also show specific tie-rods 6 and tie-rod screws 62. The heads of the tie-rods are sunk into one of the shrouds (in this instance on the right of the figure) and are simply stopped by a retaining ring 63 interacting with a shoulder 64 of the shroud. The tie-rod screws 62 are screws of which the countersunk heads are sunk into the thickness of the shroud (on the left in the figure).

This design makes it possible on the one hand to reduce the axial space requirement of the rotor and on the other hand to obtain shrouds that are practically smooth and therefore generate little noise.

The central opening of the intermediate shroud 7 of the rotor of FIG. 6 is circular, that is to say that it does not make it possible to transmit rotary force to the shaft. In this example, the whole of the torque is therefore transmitted to the shaft by the projections 34 of the metal sheets since all the shrouds (lateral and intermediate) are mounted slidingly in rotation on the shaft. The configuration shown in FIG. 1, in which the intermediate shrouds also comprise tenons, can, on the other hand, be chosen to make it even easier to transmit the torque and even easier to align the passageway 61 for the tie-rods when the rotor is assembled.

In the preferred embodiment in which the second shroud (the floating shroud 5') is bored so as to be able to slide unhindered over the grooved portion 23 of the shaft and therefore pass over the internal shoulder interacting with the first shroud, it is possible to assemble a first subassembly comprising at least the polar parts, the lateral shrouds and the tie-rods independently of the rotor shaft, for example on an assembly mandrel, before transferring this subassembly to the shaft and attaching it thereto with the shrink-fitted ring 26.

The rotor withstands without damage very high rotation speeds, much higher than 10 000 rpm, namely speeds of the order of 20 000 rpm at least. The great dimensional stability of the rotor according to the invention makes it possible to adopt a very small gap.

The figures show a hexapolar rotor, that is to say comprising 3 pairs of poles, but those skilled in the art can transpose the technical disclosures of the present application to rotors comprising for example 2, 4 or 5 pairs of poles instead of three.

The invention claimed is:

1. A buried-magnet internal rotor for an electric rotating machine, the rotor comprising:
 a shaft,
 a plurality of polar parts made of a magnetic material surrounding the shaft, the polar parts delimiting housings between them;
 a first lateral shroud and a second lateral shroud positioned axially on each side of the polar parts and mounted on the shaft, the shaft passing through each lateral shroud through a central opening in each lateral shroud;
 an external ring;
 at least one tie-rod per polar part, the tie-rod clamping each polar part between the lateral shrouds; and
 a plurality of permanent magnets placed in the said housings so that one permanent magnet is positioned between adjacent polar parts;
 wherein the shaft is shaped so as to form an internal shoulder forming an axial abutment against which the first lateral shroud is held axially by the external ring radially secured to the shaft; and
 wherein the second lateral shroud is mounted on the shaft so as to be capable of sliding along the shaft.

2. The rotor according to claim 1, wherein the external ring is shrink-fitted onto the shaft.

3. The rotor according to claim 1, wherein the central opening of the second lateral shroud is such that it can pass over the internal shoulder of the shaft.

4. The rotor according to claim 1, wherein the shoulder of the shaft interacts with a facing made in the thickness of the first lateral shroud.

5. The rotor according to claim 1, wherein the polar parts consist of a stack of magnetic metal sheets.

6. The rotor according to claim 1, wherein the shaft comprises a splined central portion, the internal shoulder being defined by one of the ends of the splined central portion.

7. An electric rotating machine comprising a rotor according to claim 1.

8. A method for manufacturing a rotor according to claim 1, wherein a subassembly comprising at least the polar parts is initially assembled, the lateral shrouds and the tie-rods independently of the shaft before, secondly, the subassembly is placed on the shaft.

9. The method according to claim 8, further comprising a step of axially attaching the said subassembly to the shaft by immobilizing the first lateral shroud between the internal shoulder of the shaft and the external ring secured to the shaft.

10. The method according to claim 9, wherein the external ring is secured to the shaft by radial shrink-fitting.

11. The rotor according to claim 1, wherein longitudinal faces of each of the polar parts have a spline formed therein, and further comprising a plurality of wedges having two flanges, each wedge being positioned between adjacent polar parts so that each flange of each wedge rests on one spline of one polar part and so that each wedge mechanically secures one of the permanent magnets radially relative to the shaft, wherein an outer surface of each wedge is flush with an external surface of the adjacent polar parts.

12. The rotor according to claim 1, wherein longitudinal faces of each of the polar parts have a spline formed therein, and further comprising a plurality of wedges having two flanges, each wedge being positioned between adjacent polar parts so that each flange of each wedge rests on one spline of one polar part and so that each wedge mechanically secures one of the permanent magnets radially relative to the shaft, wherein an outer surface of each wedge is domed so as to follow a curvature of an external surface of the adjacent polar parts.

* * * * *